June 18, 1929.  H. W. WEIDA  1,717,428
VALVE FOR FLUSH TANKS
Filed July 27, 1927

INVENTOR
Harry W. Weida
BY Archibald Coy
ATTORNEY

Patented June 18, 1929.

1,717,428

UNITED STATES PATENT OFFICE.

HARRY W. WEIDA, OF PLAINFIELD, NEW JERSEY, ASSIGNOR TO AMERICAN HARD RUBBER COMPANY, OF NEW YORK, N. Y., A CORPORATION OF NEW YORK.

VALVE FOR FLUSH TANKS.

Application filed July 27, 1927. Serial No. 208,699.

The invention relates to an improvement in valves for flush tanks and the like.

One object of the invention is to produce a valve of this type, such as a flush tank or lift valve, which can be manufactured and sold at less price than the flush tank valves as heretofore used. Another object of the invention is to produce a flush tank or lift valve in which the part which is adapted to contact with the valve seat of the tank is separable from the rest of the valve and may be renewed at trifling cost, thereby reducing the cost of repairs. A further object of the invention is to produce a valve of this type which will be efficient and durable in service. To the accomplishment of these ends the invention consists in the improved valve for flush tanks and the like hereinafter described and particularly pointed out in the appended claims.

Figure 1:
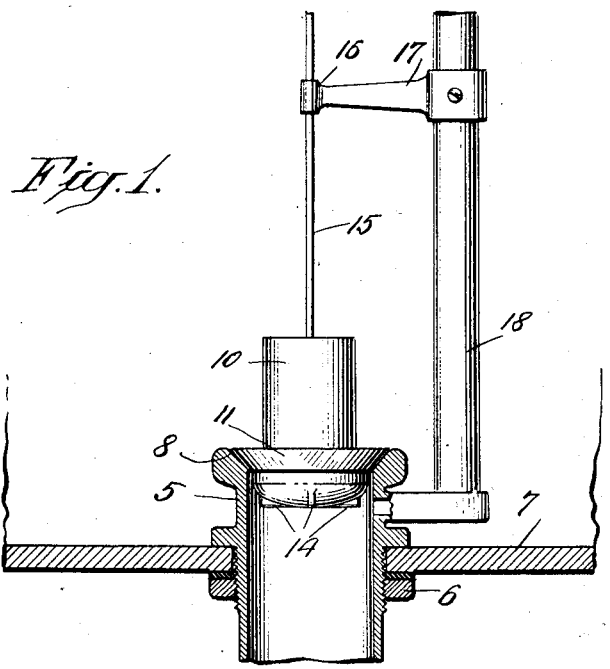
Figure 2:
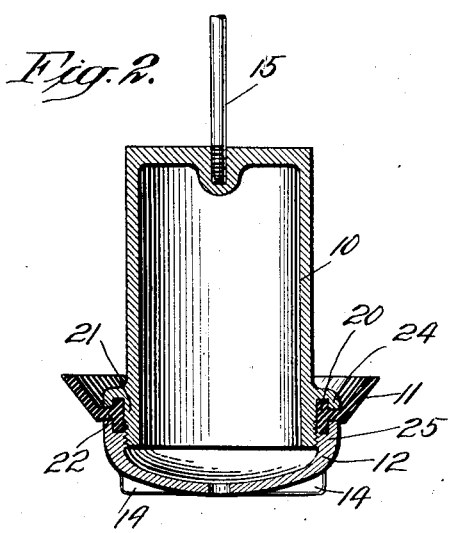
Figure 3:
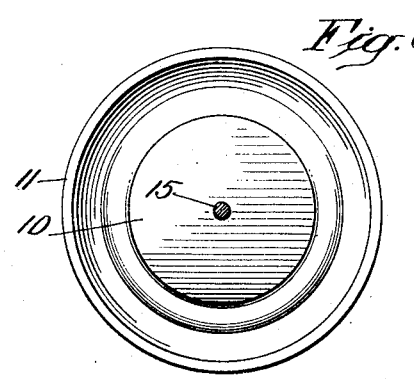
Figure 4:
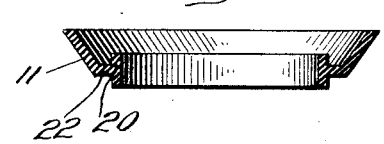

In the accompanying drawings illustrating the preferred form of the invention, Fig. 1 is a side elevation of the improved flush tank or lift valve, showing it in closed position in the discharge orifice of the flush tank; Fig. 2 is an enlarged longitudinal section through the improved valve; Fig. 3 is a top plan of the valve shown in Fig. 2; and Fig. 4 is a longitudinal section through the detachable flexible annular seat of the valve.

The improved valve of the present invention may be used in connection with any form of flush tank or the like provided with an upright cylindrical outlet orifice 5 secured by the check nut 6 in the bottom of the tank which is indicated at 7. The upper end of the discharge orifice 5 is provided with the usual beveled annular or radical valve seat 8.

The improved valve comprises a hollow cylindrical body portion 10 which may be composed of hard rubber, or other plastic material, a beveled annular seat portion 11 composed of soft rubber or other flexible material, and a hollow nut 12 closing the lower end of the hollow body portion 10, and adapted to hold the seat 11 against the lower part of the body portion. The bottom or outer face of the nut 12 is provided with the radial ribs or wings 14 to facilitate its manipulation. In the center of the closed upper end of the hollow cylindrical body portion 10 is a threaded hole adapted to receive the threaded lower end of a rod 15 by which the valve as a whole is lifted to unseal the orifice 5 to permit the contents of the tank to be discharged therethrough. The upper part of the rod 15 is guided in the outer end 16 of a bracket 17 secured to the usual overflow pipe 18 supported from the pipe constituting the discharge orifice 5.

The valve seat 8 of the discharge orifice 5 is usually of standard size and shape, and accordingly the valve seat 11 is of such shape and contour as to fit snugly therein to make a tight joint, the softness of the rubber or other material and the fact that the part 11 is a beveled annular band-like piece permitting it to conform itself readily to the surface of the valve seat 8 under the hydrostatic pressure on its upper surface. The central portion 20 of the annular valve seat 11 of the valve is cylindrical and of a size permitting it to be slipped over the lower cylindrical part 21 of the body portion of the valve. The central cylindrical portion 20 of the valve seat 11 is supported from the outer beveled annular portion of the seat 11 by a flat ring-like part 22 which, when the parts of the valve are assembled, as shown in Fig. 2, is adapted to engage with the lower face of an annular downturned flange 24 supported from the lower part of the body portion 10 of the valve and forming an annular recess adapted to receive the inner or upper end of the central portion 20 of the valve seat 11. The lower or outer projecting edge of the central portion 20 of the valve seat 11 is received within the recessed inner end 25 of the nut 12. By means of this construction the valve seat 11 is largely held against distortion and at the same time means are provided whereby a worn out valve seat may be readily removed and replaced by a new one. The inner end of the hollow nut 12 is threaded to screw onto the threaded lower end of the body portion 10.

The valve parts described above, when assembled, as shown in Fig. 2, constitute an efficient valve for use in flush tanks and the like. The valve is readily unseated under the usual upward pull exerted on the rod 15. When the contents of the tank have been discharged through the orifice 5, the valve is sucked into its seat 8 with a noticeably sharp impact, the flexible seat portion 11 of the valve substantially instantly establishing a tight joint with the seat 8 under the hydrostatic pressure on its upper surface. Since the portions 10 and 12 of the valve are constructed of hard rubber or other plastic substance not affected by water, they continue in use for indefinite periods. The flexible seat portion 11 of the valve will of course deteriorate in time, but when it does so, it is not necessary as formerly in valves of this type to replace the whole valve, but simply to replace the seat portion 11. This may be done by unscrewing the nut 12, removing the wornout valve seat 11, putting a new one in its place and screwing on the nut 12 tightly. The flexible valve seats 11 may be manufactured and sold at a fraction of the cost of the flush tank valves in common use at the present time and thus the cost and disadvantages resulting from the necessity of replacing the whole valve are eliminated.

Having thus described the invention what I claim as new is:—

1. A valve for flush tanks and the like comprising, a hollow cylindrical body portion open at its lower end and closed at its upper end, the central part of the upper end of the body portion being provided with a threaded hole for the reception of a lifting rod, a beveled annular valve seat composed of flexible material and having a cylindrical central portion adapted to fit over the lower end of the body portion, cooperating parts on the body portion and the cylindrical central portion of the valve seat to hold the latter against distortion, and a nut screwed onto the lower end of the body portion and engaging the cylindrical central portion of the valve seat to hold the valve seat in place.

2. A valve for flush tanks and the like comprising, a hollow cylindrical body portion composed of a hard plastic material closed at its upper end and open at its lower end, an annular depending flange integral with the lower part of the body portion and forming therewith an annular recess, an annular valve seat composed of a soft flexible material and having a cylindrical central portion adapted to fit over the lower end of the body portion of the valve, one part of the cylindrical portion of the valve seat being received in the annular recess, and a nut adapted to screw onto the lower end of the body portion and having an annular recess adapted to fit over another part of the central portion of the valve seat.

3. A valve for flush tanks and the like comprising, a hollow cylindrical body portion closed at its top end and open at its lower end, a beveled annular valve seat composed of a flexible material and having a cylindrical central portion adapted to fit over the lower end of the body portion, said lower part of the central body portion having an annular recess in which the upper end of the cylindrical central portion of the valve seat is adapted to be received, and a nut for closing the lower end of the body portion, said nut having an annular recess in which the lower end of the central cylindrical portion of the valve seat is received.

4. A valve for flush tanks and the like comprising, a hollow body portion provided at its top end with means for the attachment of lifting means thereto and having a cylindrical lower end, a detachable beveled annular valve seat having a central cylindrical portion adapted to fit over the lower cylindrical end of the body portion, a flange on the body portion forming an annular recess in which the upper end of the central cylindrical portion of the valve seat is received, and a nut screwed onto the lower end of the body portion for engaging the lower end of the central cylindrical portion of the valve seat to hold the valve seat in place.

5. A valve for flush tanks and the like comprising, a hollow body portion open at its lower end and closed at its top end and provided with means for the attachment of lifting means thereto, a detachable annular valve seat adapted to fit over the lower open end of the body portion, cooperating holding means on the body portion and valve seat, and a nut screwed onto the lower end of the body portion and forming a closure therefor and having means for engaging and holding the valve seat in place on the body portion.

HARRY W. WEIDA.